Aug. 15, 1961 G. C. LAABS 2,995,879
PRESS FOR HEAT-SEALING CHEESE AND THE LIKE
Filed July 19, 1957 2 Sheets-Sheet 1
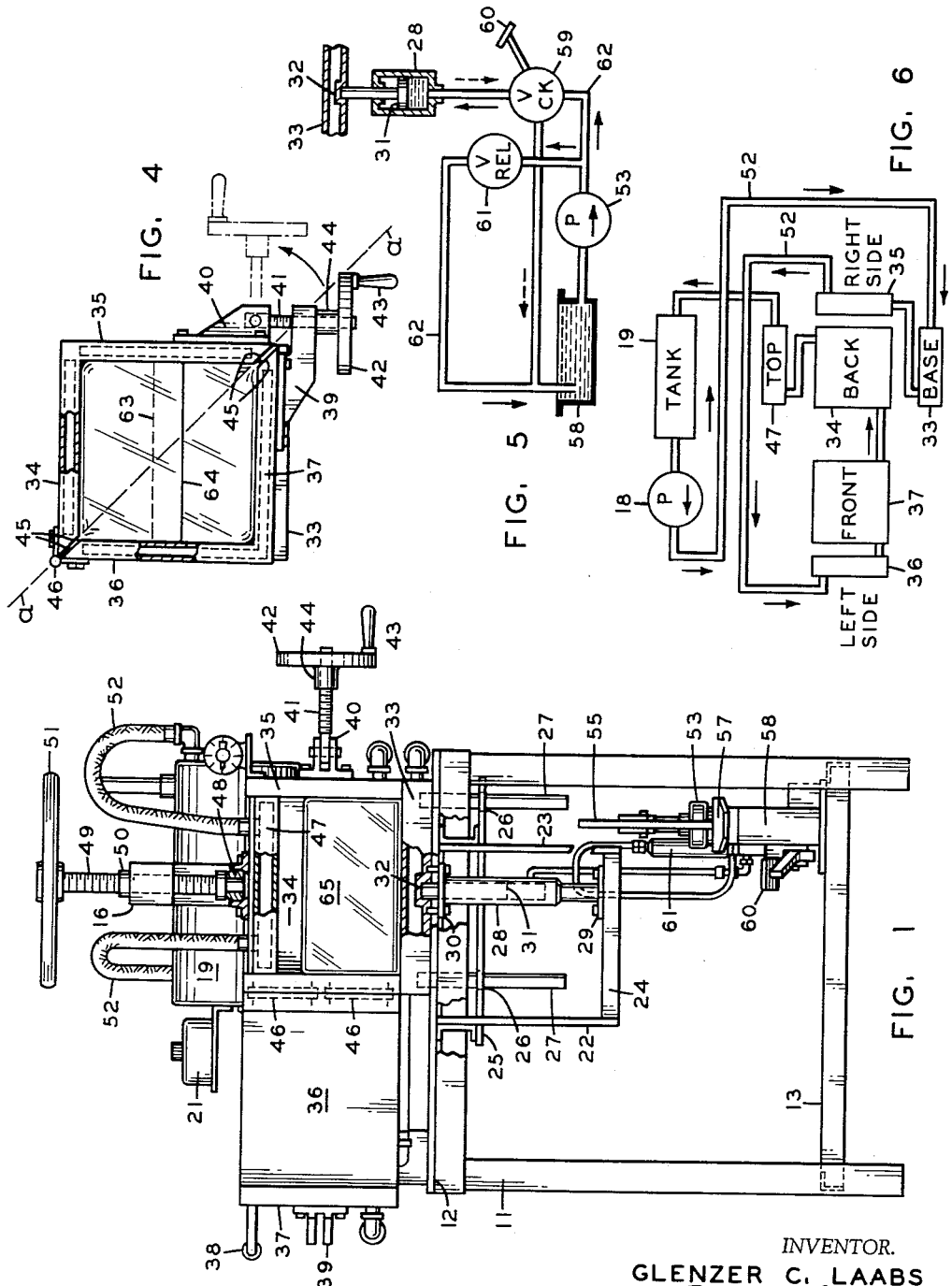
INVENTOR.
GLENZER C. LAABS
BY
ATTORNEY Aug. 15, 1961 G. C. LAABS 2,995,879
PRESS FOR HEAT-SEALING CHEESE AND THE LIKE
Filed July 19, 1957 2 Sheets-Sheet 2

INVENTOR.
GLENZER C. LAABS
BY
ATTORNEY

United States Patent Office 2,995,879
Patented Aug. 15, 1961

2,995,879
PRESS FOR HEAT-SEALING CHEESE
AND THE LIKE
Glenzer C. Laabs, P.O. Box 124, Concordia, Mo.
Filed July 19, 1957, Ser. No. 672,981
3 Claims. (Cl. 53—124)

This invention relates to presses for packaging and sealing foods, particularly cheese. As applied to cheesemaking it is utilized after a preliminary hooping and pressing of the cheese, and eliminates the steps of dressing, overnight pressing, drying and paraffining, and the formation of rind. The desirability of rindless, or "block" cheese, has been recognized for several years, but heretofore the equipment available and the laws of operation of such equipment have not been sufficiently successful in practice to achieve the cost saving which is the principal objective of such packaging.

Earlier methods and equipment had not solved the problems of bursting or punching of wrappers, pinching wrappers, and inclusion of air at the surface of the cheese resulting in mold. However, rindless block cheese made and heat-sealed by the process hereinafter described has proved to be uniform and readily manufactured without rejection for the causes noted. It not only saves cost in cheesemaking, but yields a product which cutters and processors of cheese find preferable to Cheddar's because of the absence of paraffin and rind.

Stated in somewhat greater detail, the objects of the present invention include providing an improved press for wrapping, pressing and sealing cheese blocks whereby to effect substantially complete removal of air surrounding the blocks, to avoid punching and bursting heat-sealable wrappers. The purposes also include providing a press mechanism for compacting food masses into blocks, simultaneously applying a temperature differential to all the surfaces of such blocks, sealing wrappers thereon by means of such temperature differential and removing the air around the wrapper prior to final sealing. A still further purpose includes providing a hydraulically actuated cheese press which does not punch or burst wrappers and which, in event of failure of hydraulic power, is utilizable for hand operation.

These purposes, and others which will be apparent from the specification, are achieved by the method herein described and the use of a press such as is illustrated herein.

In the accompanying drawings:

FIGURE 1 is a front view of a hydraulic press embodying the present invention, shown with the press body in lowered position and the press door opened to disclose a wrapped block of cheese therein;

FIGURE 4 is a diagrammatic horizontal view representing a simplified horizontal section through the side walls of the press;

FIGURE 5 is a hydraulic flow diagram;

FIGURE 6 is a flow diagram of the hot-water system used for heating the walls of the press, which for this purpose are shown disassociated from each other.

Figure 3:
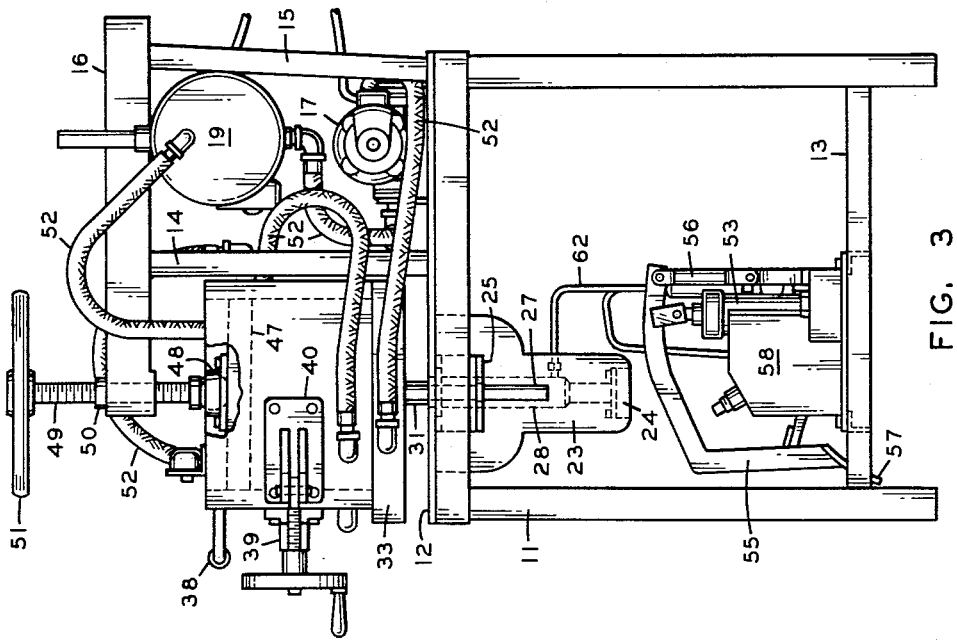
FIGURE 3 is a right end view of said press, the press body being elevated to bring the cheese block against the top wall, the top wall being slidably tilted, accommodating itself to the shape of the particular cheese block, the hydraulic actuator pedal being depressed to the bottom of its stroke.
Figure 2:
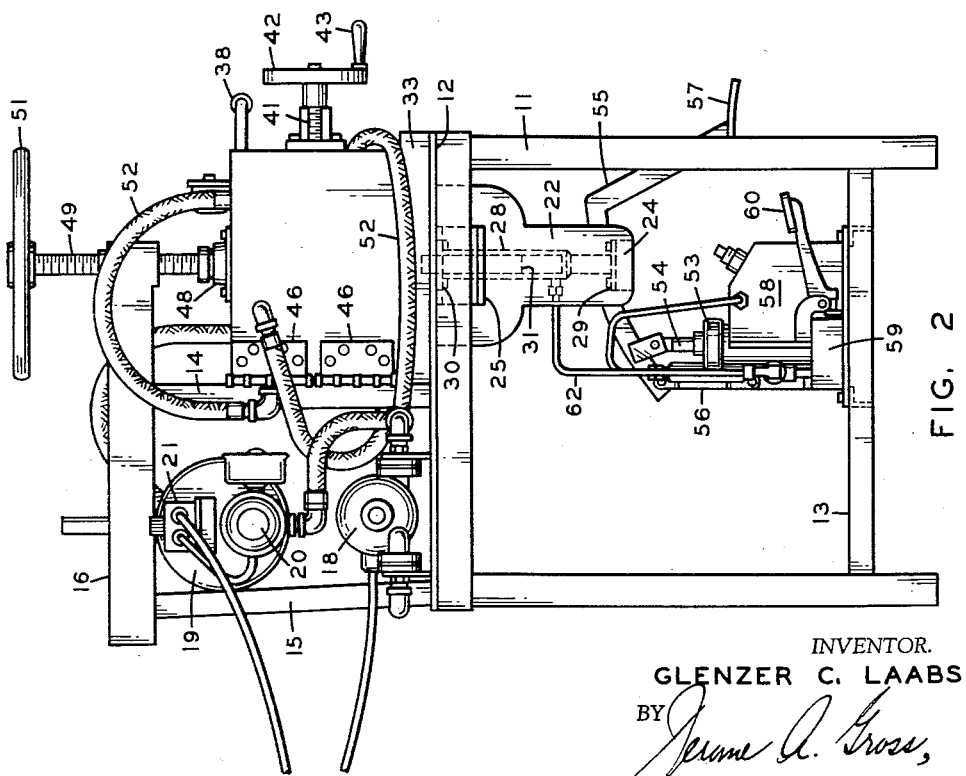
FIGURE 2 is a left end view of the press shown in FIGURE 1, the door being closed.

FIGURE 1 shows a rigid metal press frame 11 having a horizontal top bed 12 at working height, and horizontal lower support angles 13. Along the back portion of the bed 12, located to the right of center of the press, are upward-extending central and aft arm supports 14, 15 to which is welded a forwardly-extending press arm 16. Secured to the bed 12 beneath the central and aft arm supports 14, 15 are an electric pump motor 17 and a water pump 18 operatively connected thereto. Above the motor 17 and pump 18, and supported beneath the aft portion of the arm 16, is a water tank 19 having an electric heater element 20 associated therewith and a thermostat switch 21 mounted thereon.

Beneath the bed 12, forward and to the right of center, is secured a hydraulic ram assembly including a pair of left and right vertical support plates 22, 23, respectively, and a horizontal ram support beam 24 welded between them at their lower ends. Located a short distance beneath the bed 12, and supported by the verticals 22, 23 is a horizontal guide pin plate 25 which has vertical apertures 26 aligned to permit the passage of left and right guide pins 27, whose lower ends are free and whose upper ends are rigidly affixed to the rising bottom wall 33 hereafter described. The guide pins 27 are located to each side of a vertical, hydraulic ram cylinder 28 having a lower support flange 29 based upon the ram support beam 24. The upper end of the ram cylinder 28 is secured beneath the bed 12 by a flange 30.

The ram cylinder 28 has a vertical-operating ram piston 31 whose upper end engages a socket portion 32 formed within a cast aluminum bottom wall 33 of the cheese block shaping assembly. The wall 33 is flat-surfaced and hollow to conduct hot water, as hereinafter described. To its rear and right edges are rigidly secured a rear wall 34 and a right side wall 35, similarly formed and at right-angle relationship to each other. At the left rear outer corner of the rear wall 34 is a vertical hinge 46 by which are supported the left wall 36 and front wall 37, which are secured rigidly together as by welding, to form a 90° angle door member having at the front wall a projecting handle 38. Locking is effected by means of a front clevis bracket 39 and a locking rod pivot bracket 40 mounted on the right side wall 35. The pivot bracket supports a threaded rod 41 which on closing of the door can be swung between the tangs of the clevis bracket 39. A locking wheel 42 having a crank handle 43 and a threaded hub 44 is utilized for pulling up the left wall 36 and front wall 37 tightly into closed position, as shown in FIGURE 4.

The left edge of the rear wall 34, the forward edge of the right wall 35, the rear edge of the left wall 36 and the right edge of the front wall 37 are mitered edges 45. Hinging is effected by the external hinge 46 defining a vertical axis in a plane with the miters at both the rear left and forward right corners as shown by the dashed line a—a in FIGURE 4. For a substantially square press, as shown in FIGURE 4, the mitering of these edges is at 45°.

When the left wall and front wall are swung and locked into closed position, as illustrated in FIGURE 4, the four side walls 34, 35, 36, 37 are in rectangular relationship to each other and each is perpendicular to the bottom wall 33, whereby to form an open-top rectangular cavity. Within this cavity, and adjustable for setting at varying heights therein, is a top wall 47 formed of cast aluminum and hollow, like the bottom and side walls 33–37. The edges of the top wall 47 have some clearance within the side walls 34–37. A spherical bearing assembly 48 supports the top wall 47 at the midpoint of its upper surface and permits it to tilt universally with respect to its support on the lower end of a jack screw 49. This screw 49 is threaded through the forward end of the press arm 16 and may be set adjustably at any height therein by means of a set collar 50 which can be screwed downward for locking the adjustment, effected by means of an adjusting wheel 51 at the upper end of the jack screw 49.

The bottom wall 33, the side walls 34, 35, 36, 37 and the top wall 47 are cast hollow and serve as heating jackets which conduct hot water, supplied by the pump 18 from the hot water tank 19 through water conduits generally designated 52 secured to the jacketed walls by suitable fittings. The connections are such as to circulate a continuous flow of hot water through all the walls and back to the tank for reheating and recirculation. A preferred flow diagram is shown in FIGURE 6.

Near the bottom of the frame 11, and supported on the angles 13, are pedal-operated hydraulic system units including a vertical actuator cylinder 53 having a piston rod 54 extending from its upper end and adapted to be depressed by a foot-operated lever 55 to which it is pinned. Upward return of the piston rod 54 may be achieved by any suitable means, for example, a compression spring. The lever 55 extends rearward where it is fulcrumed from the upper end of a tension link 56 supported from the angles 13; and the lever 55 also extends forward to a pedal portion 57. When the piston rod is elevated as at 54 the pedal portion 57 will be nearly horizontally opposite the end of the tension link 56 from which it is fulcrumed, and will project forward of the bed 12. When the piston rod 54 is depressed, however, as shown in FIGURE 3, the pedal portion 57 will be swung downward a substantial angle, say 45° or more, from the fulcruming point and will also swing inward under the bed 12, as shown in FIGURE 3, lessening the amount of force which the operator can apply to it.

Supported on the angles 13 adjacent the actuator cylinder 53 are a hydraulic reservoir 58, a check valve 59 having a release pedal 60, and a relief valve 61. These elements are inter-connected to each other and to the ram 28 by tubing generally designated 62. A suitable pattern of connection is shown in the diagram of FIGURE 5. When pressure is applied to the hydraulic actuator 53 (designated P in FIGURE 5) and the amount of pressure does not exceed that for which the relief valve 61 is set, hydraulic fluid from the reservoir 58 will be forced through the piping 62, as shown by the solid arrows, into the ram 28, raising the piston 31 and thereby the rectangular cavity consisting of the bottom wall 33 and the side walls 34, 35, 36, 37. Whenever the pedal portion 57 of the foot-operated lever 55 is released, the check valve 59 will hold the fluid in place and therefore the cavity will stay elevated. Thus the pedal portion 57 may be permitted to return upward and additional fluid will flow from the reservoir 58 into the actuator 53 so that a second stroke may be taken. Whenever the resistance in the cavity raises the pressure in the system to a level for which the relief valve 61 is set, any excess will be relieved through the relief valve 61, and the hydraulic fluid will flow back through it to the reservoir 58. When the operator desires to lower the cavity, he presses the check valve release pedal 60, permitting return flow as shown by the dashed arrows.

The temperature of the water is maintained by the water heater 20 somewhat below boiling point, but sufficiently great to effect adequate transfer of heat to the entire inner surfaces of the press. For this purpose, adequate circulation is maintained. The cast aluminum walls conduct the heat evenly to the heat-sealing wrapper.

The process of wrapping, shaping, pressing and sealing the cheese may now be described. After the curd has drained and the cheese has been preliminarily pressed in cloth in rectangular hoops, into blocks of approximately the same plan form as the cavity shown but of lesser height, the cloth is stripped and the preliminarily formed block is wrapped in a heat-sealable wrapper. The preferred manner of wrapping is simply as follows: the block-shaped mass of cheese is placed upon a heat-sealable wrapper, the wrapper is brought up along the sides, front and rear of such mass, and the wrapper edges are overlapped across the top of the block and then folded over the ends. This simple wrap leaves a gap at the top of the block between the overlapped edges, which are shown diagrammatically in FIGURE 4, the wrapper edge extending rearwardly being numbered 63 and that extending forwardly being numbered 64. The block, so wrapped, is generally designated 65. As shown in FIGURE 1, its height will be less than the space between the top and bottom walls 47, 33 respectively. This difference in height is carefully pre-seat, by utilizing the adjusting wheel to raise or lower the top wall 47 to a definite gap, say ¾", above the height of the preliminarily formed cheese block 65 which will be placed therein. The gap should correspond substantially to the height by which the bottom wall 33 and the associated side walls 34, 35, 36, 37 are raised by a single stroke of the pedal 57. The set collar 50 may then be screwed downward to set the height so that it is not inadvertently disturbed.

The preliminarily shaped cheese block 65, so wrapped, is then placed within the press upon the bottom wall 33, and the door assembly consisting of the left wall 36 and front wall 37 is brought to closed position as shown in FIGURE 4. The relatively soft preliminarily shaped block 65 will tend to bulge outward, requiring the door assembly to be screwed backward with the locking wheel 42. As it is so screwed backward, the block will be pressed to precise rectangular plan form. The left front and right rear corners of the wrapper may be slightly rounded at their extreme edges (shown in exaggerated FIGURE 4) from the bulging of the cheese against the wrapper. As the left rear and right forward corners close there will be a tendency to squeeze and pinch the corresponding corners of the cheese block mass between them. It is essential that the wrapper be not punctured and burst, and that the pinching be minimized. The closing of the door along the line a—a, which designates the plane in which the mitered edges 45 meet, reduces such pinching to a mere squeezing back of the cheese inside the wrapper. Thus the wrapper will not be sheared or punctured by such squeezing back.

The mass of the cheese resting on the wrapper presses out any air from within the lower surface of the wrapper. As the hub 44 of the locking wheel 42 is brought to bear tightly against the clevis bracket 38, the rectangle consisting of the walls 34, 35, 36, 37 is gradually completed and the door tightly closed. All air is thus squeezed out along the sides of the wrapper and toward the top, where it escapes between the overlapped edges 63, 64.

A single pedal stroke is then applied, raising the rectangular cavity (consisting of the bottom wall 33 and the associated side walls 34–37) relative to the top wall 47 by the preset gap, so that the upper portion of the cheese mass presses against the under surface of the top wall 47. This surface is planar, but by virtue of the spherical bearing 48 is free to depart from perpendicularity to the side walls, tilting responsive to whatever the shape of the preliminarily formed block may be, after being compressed and confined by the closing of the locking wheel 42. As the top wall 47 adjusts itself tiltingly as various portions of the upper surface of the cheese block come in contact with it, it does not make any sudden tight contact with the wrapper. In this way the overlapped folds of the wrapper are left open as air is expelled with the raising of the cavity. When the pedal reaches the bottom of its stroke, as shown in FIGURE 3, the top wall 47 may be somewhat tilted as shown in that figure. It makes no difference commercially if there be a slight departure from parallelism between the top and the bottom of a block.

Inasmuch as the angularity of the pedal 57 at the bottom of its stroke and its swinging forward under the bed 12 limits the amount of pressure which can be placed upon it, the operator will be required to permit the pedal 57 to raise, and then to take a second pedal stroke. The time interval between the two strokes is sufficient to permit all the air to escape from the folds of the wrapper. The second stroke may develop the full pressure as limited by the relief valve 61. The check valve holds the pressure for any desired interval of time, which may be noted from a timer 66. This finally heat seals the wrapper. The heat causes the cheese adjacent the wrapper to "oil off," and the heat and pressure together seal the wrapper tightly against the entire surface of the cheese.

If any substantial quantity of air was entrapped within the cheese wrapper, it would tend to cause mold; but even worse, the pressure applied to air so entrapped would tend to cause bursting of the wrapper. The combination of the mitered doors, which avoid any pinching or shearing of the wrapper, with the universally tilting top wall 47, which permits the escape of air, and the setting of the gap of the top so that full pressure will not be applied at the first pedal stroke, all assure the complete expelling of air before final sealing. This new method of sealing which applies pressure first along the bottom and sides, then firms the top against a plane which may tilt and simultaneously expels the last remaining air, and finally seals the overlap at the top, effects the purposes of this invention with a far greater degree of success than prior apparatus.

While the mechanism described is designed primarily for the heat-sealing of cheese, it lends itself to the forming into blocks of foods which may or may not require the use of heat sealing. The thermally-conductive material utilized for the hollow walls also adapts itself to the flow of a refrigerant, should processing of such blocks by refrigerant be desired.

In event of failure of the hydraulic system, emergency use may be made of the press by rotating the set collar 50 to near the top of the jack screw 49 so that it is taken out of action. In such event, the adjusting wheel 51 is reset at the prescribed interval above the height of the preliminarily formed cheese block 65 each time a block is to be pressed. After the door has been closed as shown in FIGURE 4, the adjusting wheel 51 is turned to actuate the jack screw 49 to apply downward pressure until contact is made with the upper surface of the cheese block, at which time the top wall 47 will tilt slightly to accommodate itself to the portions of the block 65 with which it first makes contact, thus expelling air. Only gentle firming pressure should be exerted until the air has had an opportunity to escape through the overlap between the edges 63, 64. After the air has so escaped (leaving a time interval at least as great as that which would otherwise follow successive strokes of the pedal 57 were the hydraulic system used) the adjusting wheel 51 is forcibly turned to press the top wall 47 downward, and heavy pressure is exerted to heat-seal the cheese block. Such operation of the press manually is a valuable emergency procedure.

Other applications of the press herein described, and various modifications of the apparatus disclosed, will occur to those skilled in the art. Accordingly this invention is not to be construed narrowly, but as fully coextensive with the claims.

I claim:
1. For use together with a heat-sealable wrapper, a press for compacting and heat-sealing a food mass, comprising a top wall, means to support the top wall with tilting freedom, vertically-movable block assembly including a horizontal bottom wall and vertical side walls, said side walls being so spaced apart as to receive the top wall therebetween, whereby to form a cavity of reducible volume for compacting such food mass wrapped within such a wrapper, the top wall and the side and bottom walls each being formed of thermal conductive material, means associated with each of said walls for maintaining them at an elevated temperature suitable for heat-sealing such wrapper, hydraulic means including a foot pedal to raise the block assembly to lightly engage the tiltable top wall and the wrapper to expel the air between the wrapper and the food mass, means including a check valve to maintain the wrapper and tiltable top wall in engagement, and means to raise the block assembly from the maintained position to compress the food mass against the tiltable top wall and seal the wrapper.

2. A press as defined in claim 1, the side walls including two sides affixed to the bottom walls, each having an edge adjacent the other joined to it at 90° and having a remote edge mitered in a plane, the side walls further including two movable sides, each having an edge adjacent to the other joined to it at 90° and having a remote edge mitered in a plane, together with a hinge joining one remote edge of the movable sides to one remote edge of the affixed sides, the hinge having a vertical axis and lying in the plane coincident with the miter of all said remote wall edges, together further with means to lock releasably to each other those remote edges opposite to those hingedly joined.

3. A press as defined in claim 1, the means to support the top wall including a support arm extending from behind said block assembly above the level thereof and to a point above the center thereof, a universal joint secured to the center of the top wall, and means to position the universal joint adjustably beneath said point.

References Cited in the file of this patent
UNITED STATES PATENTS

| | | |
|---|---|---|
| 110,346 | Desgoffe | Dec. 20, 1870 |
| 148,870 | Booth | Mar. 24, 1874 |
| 151,477 | Dederick | June 2, 1874 |
| 240,326 | Naylor | Apr. 19, 1881 |
| 1,117,188 | Hesser | Nov. 17, 1914 |
| 1,531,009 | Korth | Mar. 24, 1925 |
| 1,596,117 | Pinkett | Aug. 17, 1926 |
| 1,712,513 | Morin | May 14, 1929 |
| 1,925,443 | Gere | Sept. 5, 1933 |
| 2,337,695 | Valentine et al. | Dec. 28, 1943 |
| 2,362,154 | Patrick | Nov. 7, 1944 |
| 2,602,986 | Centini et al. | July 15, 1952 |
| 2,636,433 | Wennberg | Apr. 28, 1953 |
| 2,768,085 | Erekson et al. | Oct. 23, 1956 |
| 2,777,770 | Fisher | Jan. 15, 1957 |
| 2,815,624 | Forry et al. | Dec. 10, 1957 |
| 2,887,946 | Barnes et al. | May 26, 1959 |